United States Patent [19]

Giardina

[11] Patent Number: 4,715,051
[45] Date of Patent: Dec. 22, 1987

[54] ELECTRONIC POTENTIOMETER

[76] Inventor: Joseph J. Giardina, 32 Judson, Apt. 14B, Edison, N.J. 08817

[21] Appl. No.: 722,773

[22] Filed: Apr. 12, 1985

[51] Int. Cl.$^4$ .................. G06M 3/00; H03K 23/00; H03K 21/08
[52] U.S. Cl. ........................................ 377/45; 377/53; 377/42; 307/311
[58] Field of Search .................. 377/42, 45, 53, 111, 377/114, 2; 307/311; 455/127

[56] References Cited

U.S. PATENT DOCUMENTS

| | | | |
|---|---|---|---|
| 3,639,754 | 2/1972 | Kovalcik et al. | 377/42 |
| 3,747,083 | 7/1973 | Coia | 377/42 |
| 3,895,241 | 7/1975 | Cooper | 307/311 |
| 3,922,670 | 11/1975 | Shaw et al. | 377/42 |
| 3,984,663 | 10/1976 | Buhr et al. | 377/45 |
| 4,009,372 | 2/1977 | Przybylski | 377/42 |
| 4,139,878 | 2/1979 | Shuey | 307/311 |
| 4,160,272 | 7/1979 | Thomas et al. | 377/42 |
| 4,546,262 | 10/1985 | Huggins | 307/311 |

FOREIGN PATENT DOCUMENTS 213805 9/1984 Fed. Rep. of Germany .......... 377/2

Primary Examiner—John S. Heyman
Assistant Examiner—Karl Ohralik

[57] ABSTRACT

An adjuster can provide a potentiometric type of adjustment with a control generator, a driver and a transducer. The control generator can provide an adjusting signal to the driver. The driver is coupled to the control generator for providing a drive signal in response to the adjusting signal. The transducer has its input coupled to the driver and this input is electrically isolated from its output. This output of the transducer can conduct by a variable amount in response to the adjusting signal, to simulate potentiometric action.

16 Claims, 3 Drawing Figures

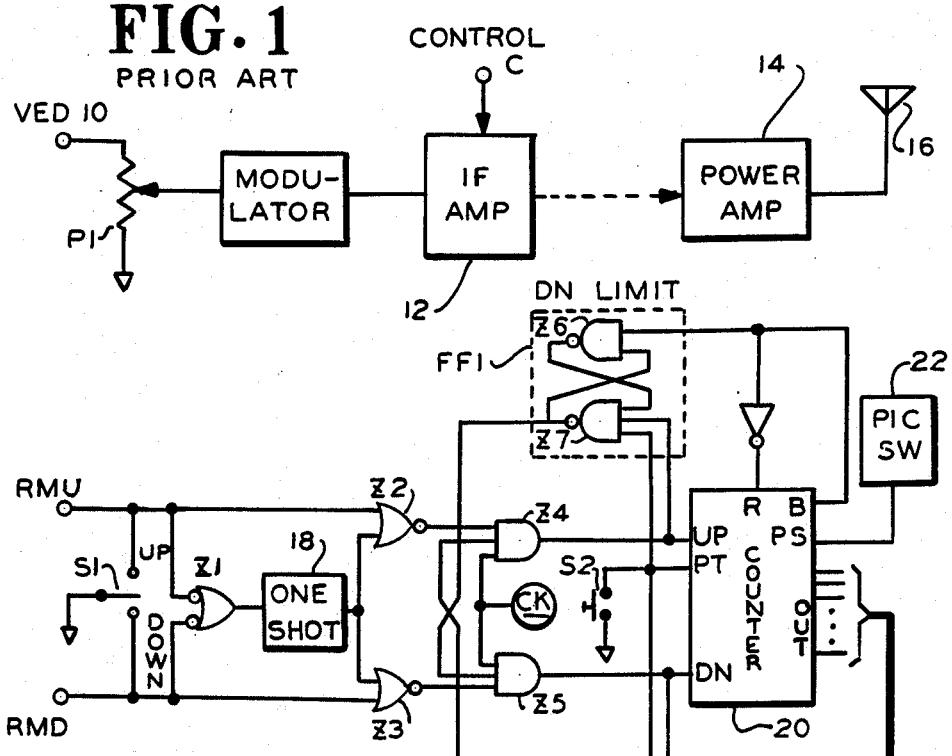
FIG. 1 PRIOR ART
FIG. 2
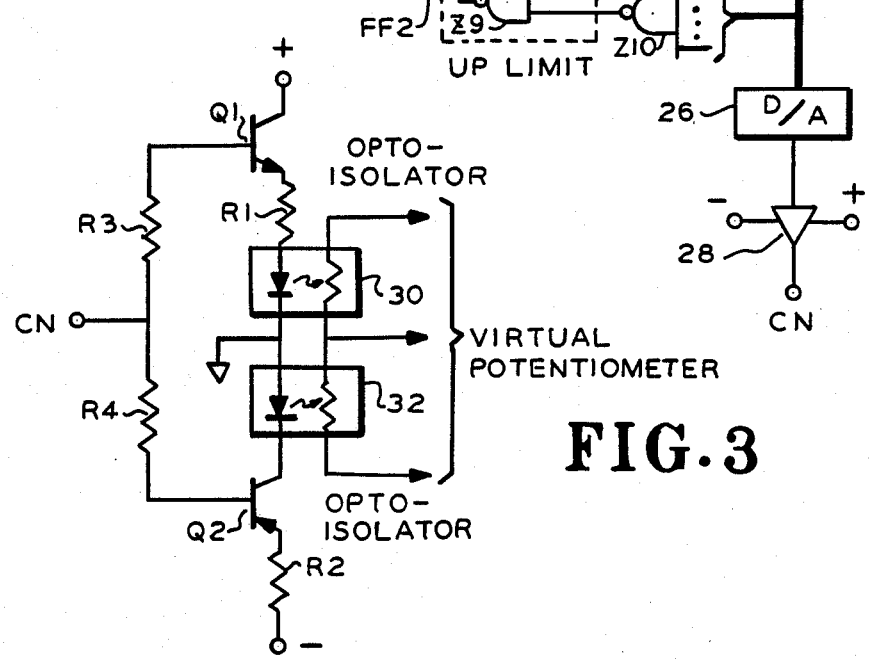
FIG. 3

ELECTRONIC POTENTIOMETER

BACKGROUND OF THE INVENTION

The present invention relates to electronic adjustments and, in particular, to circuitry for providing a variable signal.

In many electrical and electronic equipment periodic adjustments are necessary. For example, the exciter of a broadcast station needs to be periodically adjusted to set the modulation percentage and the overall power output. In a typical situation depicted in FIG. 1, a video or audio signal is applied across potentiometer P1. The wiper of potentiometer P1 is connected to modulator 10 whose output is delivered to an IF amplifier 12. The IF amplifier has a control terminal C that can receive a variable, gain-controlling signal. Variation of the control signal changes the output amplitude of IF amplifier 12. Eventually, this output is applied to power amplifier 14 driving a broadcast antenna 16.

It is desirable to adjust potentiometer P1 and the signal on control terminal C of IF amplifier 12 accurately and often remotely. One known technique involves employing servo motors to drive potentiometer P1 and another motor-driven potentiometer for producing a control signal for the control terminal C. A disadvantage with these known systems is their tendency to overshoot desired settings. Furthermore, noise and backlash in conventional potentiometers can be a problem and may degrade the accuracy of the adjustment.

Accordingly, there is a need for an improved adjustment system and technique wherein the adjustments on an electronic or electrical system can be set accurately, smoothly and without noise.

SUMMARY OF THE INVENTION

In accordance with the illustrative embodiment demonstrating features and advantages of the present invention, there is provided an adjuster for providing a potentiometric-type of adjustment. The adjuster has a control generator, a drive means and a transducer means. The control generator can provide an adjusting signal. The drive means is coupled to the control generator for providing a drive signal in response to the adjusting signal. The transducer means has an input coupled to the drive means and this input is electrically isolated from the output. This output of the transducer means can conduct by a variable amount in response to the adjusting signal, to simulate potentiometric action.

Apparatus associated with the foregoing equipment, and also in accordance with the same invention, includes a control generator for providing a variable count signal. The generator includes a clock means, a gate means and a counter means. The clock means can provide timing pulses. The gate means is coupled to the clock means for gating timing pulses. The counter means is coupled to the gate means for accumulating a count in response to timing pulses gated by the gate means, to provide a count signal signifying this count.

By employing apparatus of the foregoing type an improved adjustment technique is achieved. In the preferred embodiment of the present invention, the outputs of a pair of opto-isolators are serially connected to simulate a potentiometer. The diode inputs of the opto-isolators are also connected in series (anode to cathode) and with their junction grounded. In this preferred embodiment, complementary transistors separately connect to different inputs of the opto-isolators. By then connecting the bases of these transistors together through mixing resistors, the opto-isolators can operate in a complementary fashion so that a single input produces the potentiometric effect desired.

Also in this preferred embodiment, a digital counter receives a gated clock signal. The gating is achieved preferably from a bounce-protected manual switch, although remote commands can be used as well. The manual switch commands either an up or down count to the counter whose output is then applied to a digital to analog converter to produce the control signal. The counter uses a digital switch so that a presetting command can drive the counter to a preset, intermediate value. This feature is useful where an operator must quickly drive the system to some central setting.

In this preferred embodiment, an overflow or borrow signal is used to indicate maximum and minimum conditions, respectively. Upon reaching these limits, a flip flop can be set to prevent the counter from receiving further pulses attempting to drive the counter past its limits.

BRIEF DESCRIPTION OF THE DRAWING

The above brief description as well as other features and advantages of the present invention will be more fully appreciated by reference to the following detailed description of a presently preferred but nonetheless illustrative embodiment in accordance with the present invention when taken in conjunction with the accompanying drawings, wherein:

FIG. 1 is a schematic diagram of an adjustable system according to the prior art;

FIG. 2 is a schematic diagram of a control generator according to the principles of the present invention;

FIG. 3 is a schematic diagram of an adjuster according to the principles of the present invention.

DETAILED DESCRIPTION OF THE PREFERRED EMBODIMENT

Referring to FIG. 2, a manually operable means is shown as a single pole double throw switch S1 having a neutral position switch S1 which has its pole grounded and its other terminals marked up and down and connected to terminals RMU and RMD, respectively. Terminals RMU and RMD connect to remote signals that may remotely apply a ground to remotely control the circuitry of FIG. 2. Terminals RMU and RMD are separately connected to one terminal of NOR gates Z2 and Z3, respectively. The other inputs of gates Z2 and Z3 commonly connect to the output of a bounce means, shown herein as one shot multivibrator 18, whose input connects to the output of OR gate Z1. Gate Z1 has its two inverting inputs separately connected to terminals RMU and RMD. A gate means is shown herein as a pair of triple input AND gates Z4 and Z5 having one input separately connected to the outputs of gates Z2 and Z3, respectively.

The outputs of gates Z4 and Z5 separately connect to up and down inputs, respectively, of a counter means, shown herein as up/down counter 20. Counter 20 may be formed from a pair of integrated circuits such as type 74C193 manufactured by National Semiconductor. Counter 20 is a bidirectional counter that can be preset to a given count by appying a parallel signal at preset input PS and a command signal at presetting input PT. The parallel input PS is provided from a presetting means 22 in the form of two sets of digital thumbwheel switches. Push button switch S2 connects between terminal PT and ground.

A down means (part of a limit means) is shown including NAND gate Z6 and triple input NAND gate Z7. Gates Z6 and Z7 are connected as a flip flop (FF1) each having as output connected to one input of the other. The other input of gate Z6 connects to borrow output B of counter 20. The output of gate Z6 connects to one input. The two other inputs of gate Z7 connect to the up terminal and the presetting input PS of counter 20. The output of gate Z7 connects to one input of NAND gate Z5 whose remaining input receives timing pulses from clock means CK. Clock CK can provide timing pulses at any rate useful for changing counter 20. In one preferred embodiment pulses are applied at the rate of 4 Hz. The output of clock CK is also applied to one input of gate Z4 whose remaining input is connected to the output of triple input NAND gate Z8 which is part of an up means. The inputs of gate Z8 are separately connected to the output of NAND gate Z9 and terminals PT and DN (down count) of counter 20. Forming a flip flop, the output of gate Z8 is connected to one input of gate Z9, its other input being connected to the output of NAND gate Z10. The count data of counter 20 issues from output terminals OUT and connect to the eight inputs of gate Z10. These 8 bits of output are also connected to a converter means, in this case a conventional digital to analog converter 26. In response converter 26 provides a variable analog signal to the input of operational amplifier 28 whose output is marked terminal CN.

Referring to FIG. 3, a transducer means is shown herein as a pair of transducers 30 and 32 in the form of opto-isolators. Each opto-isolator 30 and 32 has an LED input for emitting light to affect a photo resistor (or photo transistor) within the opto-isolator. The output resistors in isolators 30 and 32 are serially connected to form three output terminals, one specific to each resistor and one common.

A drive means is shown herein including a variably conductive device in the form of NPN transistor Q1, having its collector connected to a source of positive potential. Its emitter is connected through emitter resistor R1 to the anode of the light emitting diode of isolator 30, its cathode being grounded. The anode of the light emiting diode of isolator 32 is also grounded, its cathode being connected to the collector of another variably conductive device, namely, PNP transistor Q2 whose emitter resistor R2 connects to a source of negative potential. The bases of transistors Q1 and Q2 are connected through respective base resistors R3 and R4 to previously mentioned control terminal CN.

To facilitate an understanding of the principles associated with the foregoing apparatus its operation will now be briefly described. It is assumed that switch S1 is in a neutral position so that gates Z2 and Z3 both produce low signals in response. Consequently, gates Z4 and Z5 block the timing pulses from clock CK. Counter 20 can be set to an intermediate value by depressing switch S2 which applies a low signal to terminal PT of counter 20 and loads the digital signal from switch 22 into the counter. Consequently, the preset digital signal is produced on lines OUT so that converter 26 provides a preset, amplified, analog signal on terminal CN.

Although gate Z4 applies a high signal to gate Z7, when switch S2 is depressed, it applies a low signal to another input of gate Z7 forcing it to produce a high signal which when applied to the input of gate Z6 causes it to apply a low signal to the remaining input to gate Z7 (the output of terminal B of counter 20, being high for an intermediate count, does not affect this process). Therefore, gate Z7, acting as a conventional flip flop, produces a continuing high signal. It will be appreciated that switch S2 also causes flip flop FF2 (gates Z8 and Z9) to produce on the output of gate Z8 a continuing high signal.

The switch S1 may now be thrown, for example, to the upper position. As a result, a low signal is applied to one input of gate Z1 to trigger one shot 18. Consequently, gates Z2 and Z3 remain blocked for awhile due to the high signals applied to one of the inputs of each. After multivibrator 18 returns to its stable condition, gate Z2 now produces a high signal, so long as switch S1 remains in the up position.

The high signal produced from gate Z2 when applied to gate Z4 allows the latter to pass clock pulses since the remaining input to gate Z4 receives a high signal from gate Z8. Consequently, counter 20 counts up so long as switch S1 remains in the up position. The operator may wish to release switch S1 when a desired count is achieved. Otherwise, counter 20 eventually reaches a maximum count at which time all of the outputs OUT of counter 20 are high. This condition is detected by gate Z10 which then applies a low output to flip flop FF2. This reverses flip flop FF2 causing gate Z8 to produce a low signal which when applied to an input of gate Z4 prevents any further timing pulses from reaching input UP.

The operator may now move switch S1 to the down position and, after one-shot 18 settles, the resulting high output from gate Z3 allows gate Z5 to convey timing pulses from clock CK to terminal DN to decrement counter 20. (It will be remembered that flip flop FF1 was producing from gate Z7 a continuing high output.) The first low signal produced from gate Z5 is applied to gate Z8 which then produces a high signal and reverses the state of flip flop FF2. Thereafter, the operator may reverse switch S1 and increment counter 20 without interference from flip FF2.

The reaching of the minimum count evokes a borrow output at terminal B and produces a complementary limiting function through flip flop FF1.

The resulting converter output on terminal CN can be applied directly to terminal C of IF amplifier 12 (FIG. 1). Consequently, by operating switch S1 or by providing remote ground signals on terminals RMU and/or RMD, the operator can adjust the output amplitude of IF amplifier 12. This adjustment can be done accurately, smoothly and noiselessly and is not subject to backlash or other errors.

In addition, another identical circuit as shown in FIG. 2 may be built to produce an independent signal which may be applied to input terminal CN of the circuit of FIG. 3. The variable analog signal thus applied to terminal CN can have a range of ±15 volts, although, clearly other ranges are possible. When potential at terminal CN is positive, the junctions of transistor Q2 are reverse biased so that no current flows through opto-isolator 32. However, positive potential does cause transistor Q1 to conduct. Transistor Q1 is essentially arranged as an emitter follower whereby the current through the diode of isolator 30 is proportional to the voltage on terminal CN and inversely proportional to the impedance of resistor R1 and the diode of isolator 30.

Transistor Q2 is essentially in a common collector configuration with the current through the diode of isolator 32 roughly proportional to the voltage across resistor R4 and the gain of transistor Q2. It will be appreciated therefore, that the circuit of FIG. 3 responds to a single-ended signal at terminal CN to provide an isolated, potentiometeric-type of signal on the outputs of isolators 30 and 32. Basically, the outputs of isolators 30 and 32 act as a virtual potentiometer wherein the overall series resistance remains relatively constant while the junction simulates a wiper by producing a variable voltage as the signal CN varies.

A significant advantage of the circuit of FIG. 3 is that it can be used to directly replace potentiometer P1 shown in FIG. 1. The isolation and the ability to provide a potentiometric effect is one reason why the circuit of FIG. 3 is highly adaptable to various applications.

It will be appreciated that various modifications may be implemented with respect to the above described preferred embodiment. For example, the various logic circuitries disclosed herein can be altered depending upon the types of integrated circuits being used. Furthermore, in some embodiments the counter may be allowed to count beyond its limit whereby the maximum is followed by the minimum and vice versa. It is also apparent that while adjustment of an exciter in a broadcast transmitter is disclosed, adjustment in any electrical or electronic circuit can be implemented with the equipment just described. Also, the circuitry for producing the potentiometric effect may use devices other than opto-isolators. For example, transformers may be used for isolation purposes wherein the signal conveyed has been chopped to allow conveyance through the transformer. While bipolar transistors are disclosed, clearly other transistors or other variably conductive devices may be employed instead. Furthermore, the various values and component types can be altered depending upon the desired accuracy, speed of operation, temperature stability, power rating, etc.

Obviously, many modifications and variations of the present invention are possible in light of the above teachings. It is, therefore, to be understood that within the scope of the appended claims, the invention may be practiced otherwise than as specifically described.

What is claimed is:

1. An adjuster for providing a potentiometric type of adjustment, comprising:
    a control generator for providing a bidirectionally adjustable digital signal, the direction of adjustment of said digital signal being immediately reversible, said control generator having means for producing from and in response to said digital signal an adjusting signal which is analog and bidirectionally adjustable;
    drive means coupled to said control generator for providing a drive signal in response to said adjusting signal, said drive means having a pair of sources of potential and a pair of variably conductive devices, said pair of variably conductive devices each having a control electrode and a pair of controlled electrodes, each control electrode being commonly coupled to said control generator, each pair of controlled electrodes being separately coupled to a different corresponding one of said sources, and
    a transducer means having an input coupled to said drive means and an output electrically isolated from said input, said output of said transducer means being operable to conduct by a variable amount in response to said adjusting signal to simulate potentiometric action, said transducer means comprising a pair of transducers serially connected to define three terminals of said output, each of said transducers having a transducer input, each of said pair of controlled electrodes of said drive means being separately coupled to a different corresponding one of said inputs of said transducers.

2. An adjuster according to claim 1 wherein said pair of conductive devices are arranged to be driven complementarily, so that maximum drive from one corresponds to minimum drive from the other.

3. An adjuster according to claim 2 wherein each of said transducers comprise an opto-isolator.

4. An adjuster for providing a potentiometric type of adjustment, comprising:
    a control generator for providing a bidirectionally adjustable digital signal, the direction of adjustment of said digital signal being immediately reversible, said control generator having means for producing from and in response to said digital signal an adjusting signal which is analog and bidirectionally adjustable;
    drive means coupled to said control generator for providing a drive signal in response to said adjusting signal; and
    a transducer means having an input coupled to said drive means and an output electrically isolated from said input, said output of said transducer means being operable to conduct by a variable amount in response to said adjusting signal to simulate potentiometric action, said control generator further comprising:
    (a) clock means for providing timing pulses;
    (b) gate means coupled to said clock means for gating said timing pulses; and
    (c) counter means coupled to said gate means for accumulating a count in response to timing pulses gated by said gate means and for providing a count signal signifying said count, said counter means being operable to count bidirectionally and wherein said gate means is operable to direct said timing pulses to cause counting in either direction in said counting means;
    (d) presetting means coupled to said counter means for presetting it to a predetermined intermediate count; and
    (e) limit means coupled around said counting means for stopping it from counting beyond a predetermined limit.

5. An adjuster according to claim 4 wherein said limit means includes:
    up means coupled to said counter means and having a first and second state, said up means being drivable to its first state by said count signal reaching a maximum, said up means being drivable to its second state in response to said count signal declining from said maximum to avoid locking-up.

6. An adjuster according to claim 5 wherein said limit means further includes:
    down means coupled to said counter means and having a first and second state, said down means being drivable to its first state by said count signal reaching a minimum, said down means being drivable to its second state in response to said count signal ascending from said minimum to avoid locking-up.

7. An adjuster according to claim 6 further comprising:
 manually operable means coupled to said gate means for providing to it either one of an up or down signal for directing said counter means to count either up or down, respectively.

8. An adjuster according to claim 7 further comprising:
 bounce means coupled between said manually operable means and said gate means for closing said gate for a predetermined settling interval after operation of said manually operable means so that switch bounce is inconsequential.

9. An adjuster according to claim 8 further comprising:
 converter means coupled to said counter means for providing an analog signal proportional to the count of said counter means.

10. A control generator for providing a variable count signal for controlling the input to a radio frequency power circuit, comprising:
 clock means for providing timing pulses;
 gate means coupled to said clock means for gating said timing pulses;
 counter means coupled to said gate means for accumulating a count in response to timing pulses gated by said gate means and for providing a count signal signifying said count, said counter means being operable to count bidirectionally, said gate means being operable to direct said timing pulses to cause immediately reversible counting in either direction in said counting means; converter means coupled to said counter means for providing an analog signal proportional to the count of said counter means;
 a radio frequency power circuit having a control input connected to the output of said converter means, said circuit being operable to produce a radio frequency signal having a magnitude varying in response to the count of said counter means.

11. A control generator according to claim 10 further comprising:
 presetting means coupled to said counter means for presetting it to a predetermined intermediate count.

12. A control generator according to claim 11 further comprising:
 limit means coupled around counting means for stopping it from counting beyond a predetermined limit.

13. A control generator according to claim 12 wherein said limit means include:
 up means coupled to said counter means and having a first and second state, said up means being drivable to its first state by said count signal reaching a maximum, said up means being drivable to its second state in response to said count signal declining from said maximum to avoid locking-up.

14. A control generator according to claim 13 wherein said limit means further includes:
 down means coupled to said counter means and having a first and second state, said down means being drivable to its first state by said count signal reaching a minimum, said down means being drivable to its second state in response to said count signal ascending from said minimum to avoid locking-up.

15. A control generator according to claim 14 further comprising:
 manually operable means coupled to said gate means for providing to it either one of an up or down signal for directing said counter means to count either up or down, respectively.

16. A control generator according to claim 15 further comprising:
 bounce means coupled between said manually operable means and said gate means for closing said gate for a predetermined settling interval after operation of said manually operable means so that switch bounce is inconsequential.

* * * * *